US011403533B2

(12) United States Patent
Spivack

(10) Patent No.: US 11,403,533 B2
(45) Date of Patent: Aug. 2, 2022

(54) SYSTEM AND METHOD FOR PROVIDING DISTRIBUTED INTELLIGENT ASSISTANCE

(71) Applicant: Verint Americas Inc., Alpharetta, GA (US)

(72) Inventor: Nova T. Spivack, Sherman Oaks, CA (US)

(73) Assignee: Verint Americas Inc., Alpharetta, GA (US)

( * ) Notice: Subject to any disclaimer, the term of this patent is extended or adjusted under 35 U.S.C. 154(b) by 713 days.

(21) Appl. No.: 16/242,304

(22) Filed: Jan. 8, 2019

(65) Prior Publication Data
US 2019/0138918 A1    May 9, 2019

Related U.S. Application Data

(63) Continuation of application No. 14/837,282, filed on Aug. 27, 2015, now Pat. No. 10,210,454, which is a continuation of application No. 13/271,175, filed on Oct. 11, 2011, now Pat. No. 9,122,744.

(60) Provisional application No. 61/391,967, filed on Oct. 11, 2010.

(51) Int. Cl.
*G06N 5/02* (2006.01)
*G06N 20/00* (2019.01)
*G06F 16/332* (2019.01)
*G06F 40/134* (2020.01)
*G06F 3/0485* (2022.01)

(52) U.S. Cl.
CPC ............ *G06N 5/022* (2013.01); *G06F 3/0485* (2013.01); *G06F 16/3322* (2019.01); *G06F 16/3329* (2019.01); *G06F 40/134* (2020.01); *G06N 20/00* (2019.01)

(58) Field of Classification Search
None
See application file for complete search history.

(56) References Cited

U.S. PATENT DOCUMENTS

| 5,278,980 | A | 1/1994 | Pedersen et al. |
| 5,418,948 | A | 5/1995 | Turtle |
| 5,535,120 | A | 7/1996 | Chong et al. |
| 5,615,112 | A | 3/1997 | Liu Sheng et al. |

(Continued)

FOREIGN PATENT DOCUMENTS

| CN | 103051669 | 4/2013 |
| WO | 2011/088053 | 7/2011 |

OTHER PUBLICATIONS

Hirschman, Lynette, and Robert Gaizauskas. "Natural language question answering: the view from here." natural language engineering 7.4 (2001): 275-300. (Year: 2001).*

(Continued)

*Primary Examiner* — Vincent Gonzales
(74) *Attorney, Agent, or Firm* — Meunier Carlin & Curfman LLC

(57) ABSTRACT

A system and a method for a service engine providing distributed intelligent assistance to a user are described herein. The method comprising steps of receiving and displaying a user inquiry from the user, the user inquiry having a linguistic pattern including a verb; generating and displaying a follow up question based on the user inquiry; receiving and displaying a follow up answer from the user; and generating and displaying a response based on the user inquiry and the follow up answer.

20 Claims, 6 Drawing Sheets

(56) References Cited

U.S. PATENT DOCUMENTS

| | | |
|---|---|---|
| 5,677,835 A | 10/1997 | Carbonell et al. |
| 5,682,539 A | 10/1997 | Conrad et al. |
| 5,727,174 A | 3/1998 | Aparicio et al. |
| 6,012,053 A | 1/2000 | Pant et al. |
| 6,112,177 A | 8/2000 | Cosatto et al. |
| 6,144,938 A | 11/2000 | Surace et al. |
| 6,175,829 B1 | 1/2001 | Li et al. |
| 6,282,507 B1 | 8/2001 | Horiguchi et al. |
| 6,285,978 B1 | 9/2001 | Bernth et al. |
| 6,353,817 B1 | 3/2002 | Jacobs et al. |
| 6,388,665 B1 | 5/2002 | Linnett et al. |
| 6,396,951 B1 | 5/2002 | Grefenstette |
| 6,401,061 B1 | 6/2002 | Zieman |
| 6,658,627 B1 | 12/2003 | Gallup et al. |
| 6,661,418 B1 | 12/2003 | McMillan et al. |
| 6,757,362 B1 | 6/2004 | Cooper et al. |
| 6,826,540 B1 | 11/2004 | Plantec et al. |
| 6,829,603 B1 | 12/2004 | Chai et al. |
| 6,834,120 B1 | 12/2004 | LeClerc et al. |
| 6,987,514 B1 | 1/2006 | Beresin et al. |
| 6,999,932 B1 | 2/2006 | Zhou |
| 7,058,902 B2 | 6/2006 | Iwema et al. |
| 7,076,430 B1 | 7/2006 | Cosatto et al. |
| 7,194,483 B1 | 3/2007 | Mohan et al. |
| 7,263,493 B1 | 8/2007 | Provost et al. |
| 7,337,158 B2 | 2/2008 | Fratkina et al. |
| 7,426,697 B2 | 9/2008 | Holecek et al. |
| 7,483,829 B2 | 1/2009 | Murakami et al. |
| 7,536,413 B1 | 5/2009 | Mohan et al. |
| 7,539,656 B2 | 5/2009 | Fratkina et al. |
| 7,548,899 B1 | 6/2009 | Favero et al. |
| 7,558,792 B2 | 7/2009 | Bier |
| 7,599,831 B2 | 10/2009 | Ford |
| 7,610,382 B1 | 10/2009 | Siegel |
| 7,711,547 B2 | 5/2010 | Abir |
| 7,739,604 B1 | 6/2010 | Lyons et al. |
| 7,797,146 B2 | 9/2010 | Harless et al. |
| 7,818,183 B2 | 10/2010 | Schoenberg |
| 7,912,701 B1 | 3/2011 | Gray et al. |
| 7,970,663 B2 | 6/2011 | Ganz et al. |
| 8,160,979 B1 | 4/2012 | Evans et al. |
| 8,346,563 B1 | 1/2013 | Hjelm et al. |
| 8,352,266 B2 | 1/2013 | Farmaner et al. |
| 8,401,842 B1 | 3/2013 | Ginzburg et al. |
| 8,433,556 B2 | 4/2013 | Fraser et al. |
| 8,473,420 B2 | 6/2013 | Bohus |
| 8,510,276 B2 | 8/2013 | Haiby et al. |
| 8,519,963 B2 | 8/2013 | Kocienda et al. |
| 8,554,856 B2 | 10/2013 | Plotkin |
| 8,670,979 B2 | 3/2014 | Gruber et al. |
| 8,677,251 B2 | 3/2014 | Kwok et al. |
| 8,677,377 B2 | 3/2014 | Cheyer et al. |
| 8,731,929 B2 | 5/2014 | Kennewick et al. |
| 8,756,326 B1 | 6/2014 | Elberse et al. |
| 8,762,152 B2 | 6/2014 | Bennett et al. |
| 8,819,003 B2 | 8/2014 | Anick et al. |
| 8,930,191 B2 | 1/2015 | Gruber et al. |
| 8,942,986 B2 | 1/2015 | Cheyer et al. |
| 8,943,094 B2 | 1/2015 | Brown et al. |
| 9,117,447 B2 | 8/2015 | Gruber et al. |
| 9,202,171 B2 | 12/2015 | Kuhn |
| 9,495,331 B2 | 11/2016 | Govrin et al. |
| 9,501,741 B2 | 11/2016 | Cheyer et al. |
| 9,965,129 B2 | 5/2018 | Reiley et al. |
| 2001/0000356 A1 | 4/2001 | Woods |
| 2001/0033298 A1 | 10/2001 | Slotznick |
| 2001/0044751 A1 | 11/2001 | Pugliese et al. |
| 2001/0049688 A1* | 12/2001 | Fratkina ............... G06F 16/954 |
| 2001/0053968 A1 | 12/2001 | Galitsky et al. |
| 2002/0008716 A1 | 1/2002 | Colburn et al. |
| 2002/0032591 A1 | 3/2002 | Mahaffy et al. |
| 2002/0123994 A1 | 9/2002 | Schabes et al. |
| 2002/0129031 A1 | 9/2002 | Lau et al. |
| 2002/0198885 A1 | 12/2002 | Streepy |
| 2003/0004908 A1 | 1/2003 | Linthicum et al. |
| 2003/0041307 A1 | 2/2003 | Park |
| 2003/0061029 A1 | 3/2003 | Shaket |
| 2003/0088547 A1 | 5/2003 | Hammond |
| 2003/0126089 A1 | 7/2003 | Fukuoka et al. |
| 2003/0126090 A1 | 7/2003 | Fukuoka et al. |
| 2003/0134632 A1 | 7/2003 | Loughran |
| 2003/0142829 A1 | 7/2003 | Avigni |
| 2003/0212544 A1 | 11/2003 | Acero et al. |
| 2004/0107088 A1 | 6/2004 | Budzinski |
| 2004/0141013 A1 | 7/2004 | Alcazar et al. |
| 2004/0186705 A1 | 9/2004 | Morgan et al. |
| 2005/0027524 A1 | 2/2005 | Wu et al. |
| 2005/0027694 A1 | 2/2005 | Sauermann |
| 2005/0054381 A1 | 3/2005 | Lee et al. |
| 2005/0120276 A1 | 6/2005 | Kolawa et al. |
| 2006/0004826 A1 | 1/2006 | Zartler et al. |
| 2006/0020466 A1 | 1/2006 | Cousineau et al. |
| 2006/0036430 A1 | 2/2006 | Hu |
| 2006/0037076 A1 | 2/2006 | Roy |
| 2006/0047632 A1 | 3/2006 | Zhang |
| 2006/0067352 A1 | 3/2006 | John et al. |
| 2006/0074689 A1 | 4/2006 | Cosatto et al. |
| 2006/0074831 A1 | 4/2006 | Hyder et al. |
| 2006/0080107 A1 | 4/2006 | Hill et al. |
| 2006/0092978 A1 | 5/2006 | John et al. |
| 2006/0161414 A1 | 7/2006 | Carignano et al. |
| 2006/0206483 A1 | 9/2006 | Knepper et al. |
| 2006/0230410 A1 | 10/2006 | Kurganov et al. |
| 2006/0253427 A1 | 11/2006 | Wu |
| 2007/0043687 A1 | 2/2007 | Bodart et al. |
| 2007/0100790 A1 | 5/2007 | Cheyer et al. |
| 2007/0106670 A1 | 5/2007 | Yoakum et al. |
| 2007/0130112 A1 | 6/2007 | Lin |
| 2007/0134631 A1 | 6/2007 | Hardy et al. |
| 2007/0156677 A1 | 7/2007 | Szabo |
| 2007/0185702 A1 | 8/2007 | Harney et al. |
| 2007/0197296 A1 | 8/2007 | Lee |
| 2007/0265533 A1 | 11/2007 | Tran |
| 2007/0294229 A1 | 12/2007 | Au |
| 2008/0005158 A1 | 1/2008 | Zartler et al. |
| 2008/0010268 A1 | 1/2008 | Liao et al. |
| 2008/0016040 A1 | 1/2008 | Jones et al. |
| 2008/0036756 A1 | 2/2008 | Gaos et al. |
| 2008/0091406 A1 | 4/2008 | Baldwin et al. |
| 2008/0096533 A1 | 4/2008 | Manfredi et al. |
| 2008/0133444 A1 | 6/2008 | Gao et al. |
| 2008/0153474 A1 | 6/2008 | Scott |
| 2008/0162498 A1* | 7/2008 | Omoigui ............... G06F 16/958 |
| 2008/0222734 A1 | 9/2008 | Redlich et al. |
| 2008/0235604 A1 | 9/2008 | Eber |
| 2008/0305815 A1 | 12/2008 | McDonough |
| 2009/0006525 A1 | 1/2009 | Moore |
| 2009/0030767 A1 | 1/2009 | Morris et al. |
| 2009/0030800 A1 | 1/2009 | Grois |
| 2009/0063427 A1 | 3/2009 | Zuta et al. |
| 2009/0070103 A1 | 3/2009 | Beggelman et al. |
| 2009/0077488 A1 | 3/2009 | Ording |
| 2009/0089100 A1 | 4/2009 | Nenov et al. |
| 2009/0119095 A1 | 5/2009 | Beggelman et al. |
| 2009/0119587 A1 | 5/2009 | Allen et al. |
| 2009/0157386 A1 | 6/2009 | Zhou |
| 2009/0171720 A1 | 7/2009 | Crook et al. |
| 2009/0171923 A1 | 7/2009 | Nash et al. |
| 2009/0182702 A1 | 7/2009 | Miller |
| 2009/0204677 A1 | 8/2009 | Michaelis et al. |
| 2009/0216691 A1 | 8/2009 | Borzestowski et al. |
| 2009/0225041 A1 | 9/2009 | Kida et al. |
| 2009/0227223 A1 | 9/2009 | Jenkins |
| 2009/0228264 A1 | 9/2009 | Williams et al. |
| 2009/0228325 A1 | 9/2009 | Simmons et al. |
| 2009/0235356 A1 | 9/2009 | Jensen et al. |
| 2009/0248399 A1 | 10/2009 | Au |
| 2009/0271205 A1 | 10/2009 | Finn et al. |
| 2010/0005122 A1 | 1/2010 | Jackson |
| 2010/0030549 A1 | 2/2010 | Lee et al. |
| 2010/0050237 A1 | 2/2010 | Bokor et al. |
| 2010/0070448 A1 | 3/2010 | Omoigui |
| 2010/0070871 A1 | 3/2010 | Liesche |
| 2010/0153398 A1 | 6/2010 | Miller et al. |

(56) References Cited

U.S. PATENT DOCUMENTS

| | | |
|---|---|---|
| 2010/0169336 A1 | 7/2010 | Eckhoff-Hornback et al. |
| 2010/0226490 A1 | 9/2010 | Schultz et al. |
| 2010/0235808 A1 | 9/2010 | Dayan et al. |
| 2010/0281012 A1 | 11/2010 | Imig |
| 2010/0287059 A1 | 11/2010 | McCoy et al. |
| 2010/0312547 A1 | 12/2010 | Van Os et al. |
| 2011/0004841 A1 | 1/2011 | Gildred et al. |
| 2011/0071819 A1 | 3/2011 | Miller et al. |
| 2011/0078105 A1 | 3/2011 | Wallace |
| 2011/0119196 A1 | 5/2011 | Ventura |
| 2011/0179126 A1 | 7/2011 | Wetherell et al. |
| 2011/0213642 A1 | 9/2011 | Makar et al. |
| 2011/0288947 A1 | 11/2011 | Biran |
| 2011/0301982 A1 | 12/2011 | Green et al. |
| 2011/0307245 A1 | 12/2011 | Hanneman et al. |
| 2012/0016678 A1 | 1/2012 | Gruber et al. |
| 2012/0022872 A1 | 1/2012 | Gruber et al. |
| 2012/0030553 A1 | 2/2012 | Delpha et al. |
| 2012/0041903 A1 | 2/2012 | Beilby et al. |
| 2012/0078891 A1 | 3/2012 | Brown et al. |
| 2012/0110473 A1 | 5/2012 | Tseng |
| 2012/0117005 A1 | 5/2012 | Spivack |
| 2012/0221502 A1 | 8/2012 | Jerram et al. |
| 2012/0245926 A1 | 9/2012 | Montyne et al. |
| 2012/0253825 A1 | 10/2012 | Di Fabbrizio |
| 2012/0265528 A1 | 10/2012 | Gruber et al. |
| 2012/0284040 A1 | 11/2012 | Dupin |
| 2012/0311541 A1 | 12/2012 | Bullard et al. |
| 2013/0017523 A1 | 1/2013 | Barborak |
| 2013/0031476 A1 | 1/2013 | Coin et al. |
| 2013/0046149 A1 | 2/2013 | Gettelman et al. |
| 2013/0152092 A1 | 6/2013 | Yadgar |
| 2013/0204813 A1 | 8/2013 | Master et al. |
| 2013/0205975 A1 | 8/2013 | Williams |
| 2013/0254139 A1 | 9/2013 | Lei |
| 2013/0258040 A1 | 10/2013 | Kaytaz et al. |
| 2013/0262467 A1 | 10/2013 | Zhang et al. |
| 2013/0275875 A1 | 10/2013 | Gruber et al. |
| 2013/0282709 A1 | 10/2013 | Zhu et al. |
| 2013/0283168 A1 | 10/2013 | Brown et al. |
| 2013/0317848 A1 | 11/2013 | Savin |
| 2014/0019303 A1 | 1/2014 | Argue et al. |
| 2014/0029734 A1 | 1/2014 | Kim et al. |
| 2014/0040748 A1 | 2/2014 | Lemay et al. |
| 2014/0045470 A1 | 2/2014 | Bridge et al. |
| 2014/0046792 A1 | 2/2014 | Ganesan |
| 2014/0047001 A1 | 2/2014 | Phillips et al. |
| 2014/0053102 A1 | 2/2014 | Lee et al. |
| 2014/0066105 A1 | 3/2014 | Bridge et al. |
| 2014/0074454 A1 | 3/2014 | Brown et al. |
| 2014/0098948 A1 | 4/2014 | Kulkarni et al. |
| 2014/0115456 A1 | 4/2014 | Whit et al. |
| 2014/0164476 A1 | 6/2014 | Thomson |
| 2014/0164508 A1 | 6/2014 | Lynch et al. |
| 2014/0181741 A1 | 6/2014 | Apacible et al. |
| 2014/0201675 A1 | 7/2014 | Joo et al. |
| 2014/0244266 A1 | 8/2014 | Brown et al. |
| 2014/0244712 A1 | 8/2014 | Walters et al. |
| 2014/0245140 A1 | 8/2014 | Brown et al. |
| 2014/0258503 A1 | 9/2014 | Tong et al. |
| 2014/0282109 A1 | 9/2014 | Wenger et al. |
| 2014/0297284 A1 | 10/2014 | Gruber et al. |
| 2014/0310005 A1 | 10/2014 | Brown et al. |
| 2014/0317502 A1 | 10/2014 | Brown et al. |
| 2014/0337048 A1 | 11/2014 | Brown et al. |
| 2014/0343924 A1 | 11/2014 | Brown et al. |
| 2014/0343928 A1 | 11/2014 | Brown et al. |
| 2014/0365223 A1 | 12/2014 | Brown et al. |
| 2014/0365407 A1 | 12/2014 | Brown et al. |
| 2015/0066817 A1 | 3/2015 | Slayton et al. |
| 2015/0185996 A1 | 7/2015 | Brown et al. |
| 2015/0186154 A1 | 7/2015 | Brown et al. |
| 2015/0186155 A1 | 7/2015 | Brown et al. |
| 2015/0186156 A1 | 7/2015 | Brown et al. |
| 2016/0012186 A1 | 1/2016 | Zasowski et al. |
| 2016/0110071 A1 | 4/2016 | Brown et al. |
| 2017/0132220 A1 | 5/2017 | Brown et al. |
| 2017/0277993 A1 | 9/2017 | Beaver et al. |

OTHER PUBLICATIONS

Adamic, Lada, and Eytan Adar. "How to search a social network." Social networks 27.3 (2005): 187-203. (Year: 2005).*

Ramabhadran S, Ratnasamy S, Hellerstein JM, Shenker S. Prefix hash tree: An indexing data structure over distributed hash tables. In Proceedings of the 23rd ACM symposium on principles of distributed computing Jul. 2004 (vol. 37). St. John's. 10 pages. (Year: 2004).*

Ratnasamy S, Francis P. Handley M, Karp R, Shenker S. A scalable content-addressable network. InProceedings of the 2001 conference on Applications, technologies, architectures, and protocols for computer communications Aug. 27, 2001 (pp. 161-172). (Year: 2001).*

"5 wearable electronic phones", retrieved on Feb. 13, 2015 at <<http://limcorp.net/2009/5-wearable-electronic-phones>>, 12 pages.

"Case Study With Aime, Alaska Airlines soars", retrieved on Apr. 10, 2015 at <<http://www.nextit.com/media/downloads/Case-study-Alaska-Air.pdf>>, 3 pages.

Cassell, et al., "Embodied Conversational Agents", MIT Press, 2000, pp. 272 and 275.

"Frost & Sullivan Commends Next IT for Leading the Virtual Agent Applications Industry in Competitive Strategy Innovation", Frost & Sullivan, Dec. 18, 2014, 5 pages.

Guzzoni, Didier, et al., "Modeling Human-Agent Interaction with Active Ontologies," Spring 2007 AAAI Symposium, 8 pages.

Krahmer, Emiel et al., "Problem Spotting in Human-Machine Interaction", IPO, Center for Research on User-System Interaction, Sixth European Conference on Speech Communication and Technology, Sep. 5-9, 1999, Budapest, Hungary, 4 pages.

Langkilde, Irene et al., "Automatic Prediction of Problematic Human-Computer Dialogues in 'How May I Help You?'", AT&T Labs Research, 1999, 5 pages.

"Meet Jenn, Your Virtual Assistant at alaskaair.com", retrieved on Apr. 13, 2015 at <<http://www.alaskaair.com/content/about-us/site-info/ask-jenn.aspx>>, 1 page.

"SGT Star Wins Intelligent Assistant Award", San Francisco, Calif (PRWEB) Sep. 24, 2014, PRWEB Online Visibility from Vocus, 2 pages.

"TAM", Case Study Meet Juli—TAM Airlines' most famous new hire, Next IT Corporation, 2 pages.

"The Armys Robot Recruiter", Transcript from New York Public Radio, Aug. 8, 2014, 3 pages.

Walker, Marilyn et al., "Learning to Predict Problematic Situations in a Spoken Dialogue System: Experiments with How May I Help You?", AT&T Labs Research, NAACL 2000 Proceedings of the 1st North American chapter of the Association for Computational Linguistics conference, Seattle, Washington, Apr. 29-May 4, 2000, 8 pages.

Wikipedia page "CALO", retrieved on Nov. 15, 2017 at <<https://en.wikipedia.org/wiki/CALO>>, 5 pages.

* cited by examiner

SYSTEM AND METHOD FOR PROVIDING DISTRIBUTED INTELLIGENT ASSISTANCE

PRIORITY CLAIM

This application is a continuation of U.S. patent application Ser. No. 14/837,282, filed on Aug. 27, 2015, which is a continuation of U.S. patent application Ser. No. 13/271,175, filed on Oct. 11, 2011, now U.S. Pat. No. 9,122,744, which claims the benefit of U.S. Provisional Application No. 61/391,967 under 35 USC 119(e), filed on Oct. 11, 2010, the contents of which is incorporated herein by reference.

BACKGROUND

Web search engines that exist today provide services to search for information on the Internet. Web search engines operate algorithmically to provide search results based on user inquiries. The search results are typically presented in a list of results that contains reference links to web pages. However, a web search engine provides a narrow form of intelligent assistance for a single activity: search.

BRIEF DESCRIPTION OF THE DRAWINGS

One or more embodiments of the present invention are illustrated by way of example and are not limited by the figures of the accompanying drawings, in which like references indicate similar elements.

DETAILED DESCRIPTION

Figure 1A:
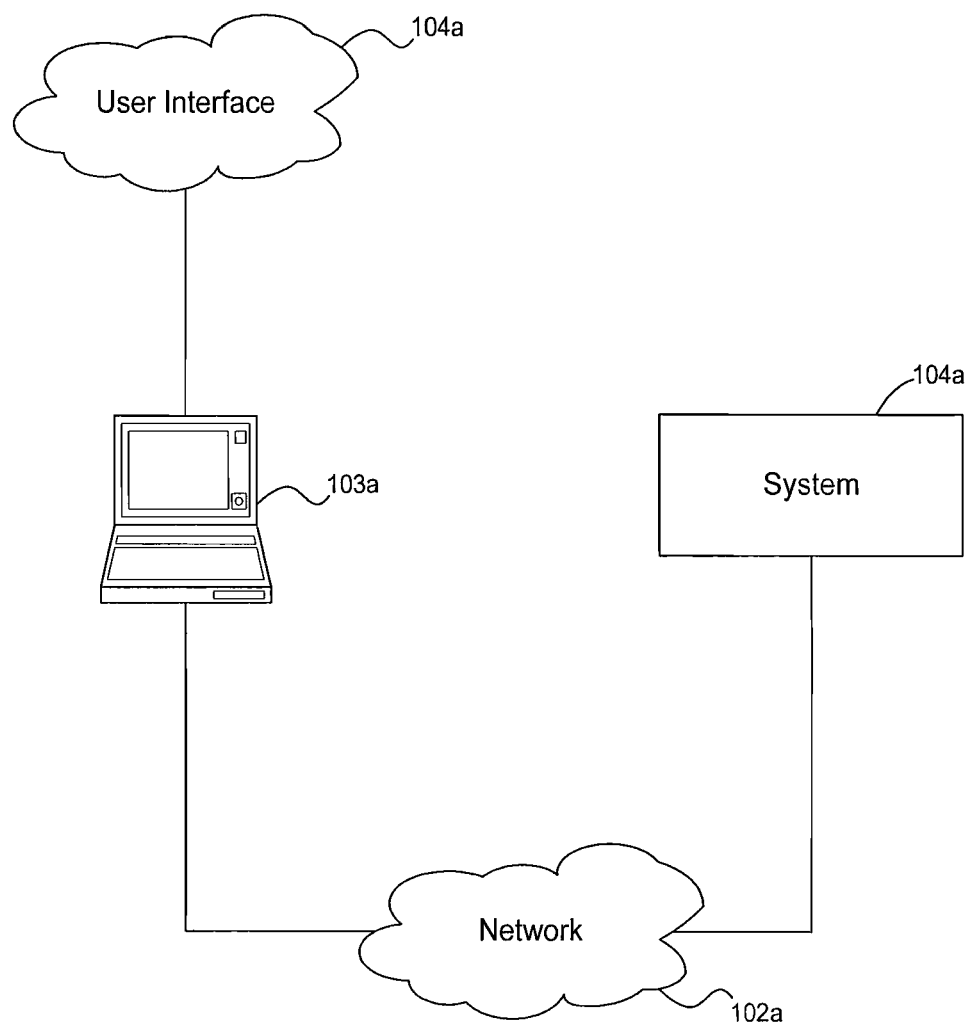
FIG. 1a illustrates an example block diagram of a client device able to communicate with a system according to one embodiment through a network.

References in this specification to "an embodiment," "one embodiment," or the like mean that the particular feature, structure, or characteristic being described is included in at least one embodiment of the present invention. Occurrences of such phrases in this specification do not necessarily all refer to the same embodiment.

Introduced herein are an apparatus and a method for a service engine providing distributed intelligent assistance to users. The service engine (also referred to as the system or the apparatus) provides distributed intelligent assistance to users to help them complete a variety of tasks for different kinds of actions. Essentially this is a service engine that supports a variety of verbs beyond just "search." The users can make commands like buy, sell, publish, subscribe, give, get, put, save, create, make, start, stop, go to, for a variety of purposes.

Once the user makes a request to the service engine, the service engine attempts to understand the request. This may involve dialoging with the user and/or using various software-mediated or human-mediated additional services that help make sense of the request. The service engine then sends the request to one or more service nodes it knows about that have services capable of responding to that kind of request. The service nodes receive the request, and reply to the system with their responses. The service engine then makes sense of the responses from various services and presents the result(s) in an organized and sensible form to the user. This may include providing a higher level overview, such as a guide or dossier, which the service constructs about the results, particular recommendations. It may involve providing the user with the results from other services themselves. The user may then interact with the system further to make further requests that relate to the results. For example, the user may make requests to refine the results, make a refined query, drill into a particular result, etc. They may make a new request altogether, or they may take other actions such as sharing the results with someone else, saving the results, etc.

According to one embodiment, there is provided a system providing distributed intelligent assistance to a user. The system comprising a root node, a plurality of service nodes, an input interface and an output interface. Each service node is associated with one or more service(s). Each service node is configured to receive requests and to generate and send responses based on the associated services. The input interface is configured to receive a user inquiry provided by the user. The root node is configured to receive the user inquiry from the input interface. The root node is further configured to recognize a linguistic pattern including a verb from the user input and to parse the user input into a request based on the linguistic pattern including the verb. The root node is further configured to select one or more service node(s) matching to the request from a node-service index, the node-service index listing services associated with each service node. The root node is further configured to send the request to the service node(s) and to receive one or more response(s) from the service node(s). The root node is further configured to construct and send out a result based on the response(s). The output interface is configured to receive and present the result to the user.

In an embodiment, the root node is further configured to parse a user inquiry comprising at least one phrase in a language selected from the group consisting of a natural language, a formal language, and a specific syntax language.

In another embodiment, the user inquiry comprises at least one verb of find, search, buy, sell, publish, send, ask, answer, get, offer, compare, like, make, automate, call, set, teach, learn, remember, save, schedule, meet, compute, learn, publish, subscribe, give, put, save, create, make, post, start, stop, go to, keep, is, modify, offer, alert, book, summarize, endorse, view, help, launch, or a synonym thereof.

In yet another embodiment, the root node comprises a plurality of root sub-nodes inter-connected via a network and each root sub-node is configured to perform a portion of or all of the functionalities of the root node.

In still another embodiment, at least one of the service nodes is connected with the root node via the Internet.

In yet still another embodiment, at least one of the service nodes is hosted virtually on the root node.

In still yet another embodiment, at least one of the service nodes is further configured to add or remove an associated service and to send a notice to the root node for updating the node-service index.

In yet still another embodiment, at least one of the service nodes is further configured to interact with an outside third-party service.

In still yet another embodiment, at least one of the service nodes is further configured to receive a response generated by a human.

In yet still another embodiment, the input interface is further configured to solicit additional information from the user via a dialogue or a form. In still yet another embodiment, the root node is further configured to update the request based on the additional information.

In yet still another embodiment, the result is a dossier that comprises at least one content selected from the group consisting of answer, number, formula, summary, recommendation, list, table, statistics, map, graph, picture, review, audio, video, price, availability, feature, advertisement, contact, reference, excerpt, and link to services.

In still yet another embodiment, the input interface comprises at least one interface selected from the group consisting of browser plug-in, browser input field, mobile application, web page, browser toolbar, computer application, computer toolbar, widget in a website, speech recognition, and application programming interface (API).

In yet still another embodiment, the root node is further configured to learn the request and the result based on an artificial intelligence analysis.

In still yet another embodiment, the system further comprises a nodeserver program configured to install on at least one of the service nodes or an external node to provide a service.

In yet still another embodiment, the output interface comprises at least one interface selected from the group consisting of browser plug-in, browser input field, mobile application, web page, message, email, browser toolbar, computer application, computer toolbar, widget in a website, speech, and application programming interface (API).

According to another embodiment, there is provided a method for providing distributed intelligent assistance to a user. The method comprising the steps of receiving a user input provided by the user; recognizing a linguistic pattern including a verb from the user input; parsing the user input into a request based on the linguistic pattern including the verb; selecting one or more service node(s) matching to the request from a node-service index, the node-service index listing services associated with each service node; sending the request to the service node(s); receiving one or more response(s) from the service node(s); constructing a result based on the response(s); and presenting the result to the user.

In an embodiment, the method further comprises steps of soliciting additional information from the user via a dialogue or a form; and updating the request based on the additional information.

In another embodiment, the method further comprises a step of learning the request and the result based on an artificial intelligence analysis.

According to another embodiment, there is a computer-readable storage medium comprising computer-executable instruction for performing a method for providing distributed intelligent assistance to a user. The method comprises the steps of receiving a user input provided by the user; recognizing a linguistic pattern including a verb from the user input; parsing the user input into a request based on the linguistic pattern including the verb; soliciting additional information from the user via a dialogue or a form; updating the request based on the additional information; selecting one or more service node(s) matching to the request from a node-service index, the node-service index listing services associated with each service node; sending the request to the service node(s); receiving one or more response(s) from the service node(s); constructing a result based on the response(s); and presenting the result to the user.

FIG. 1a illustrates an example block diagram of a client device 103a able to communicate with a system 101a that provides distributed intelligent assistance to a user. The client device 103a can be any system and/or device, and/or any combination of devices/systems that is able to establish a connection with another device, a server and/or other systems. In one embodiment, the client device 103a is coupled to a network 102a. In some embodiments, the device 103a and the system 101a are directly connected to one another. The user interacts with the system 101a via the user interface 104a.

Figure 1:
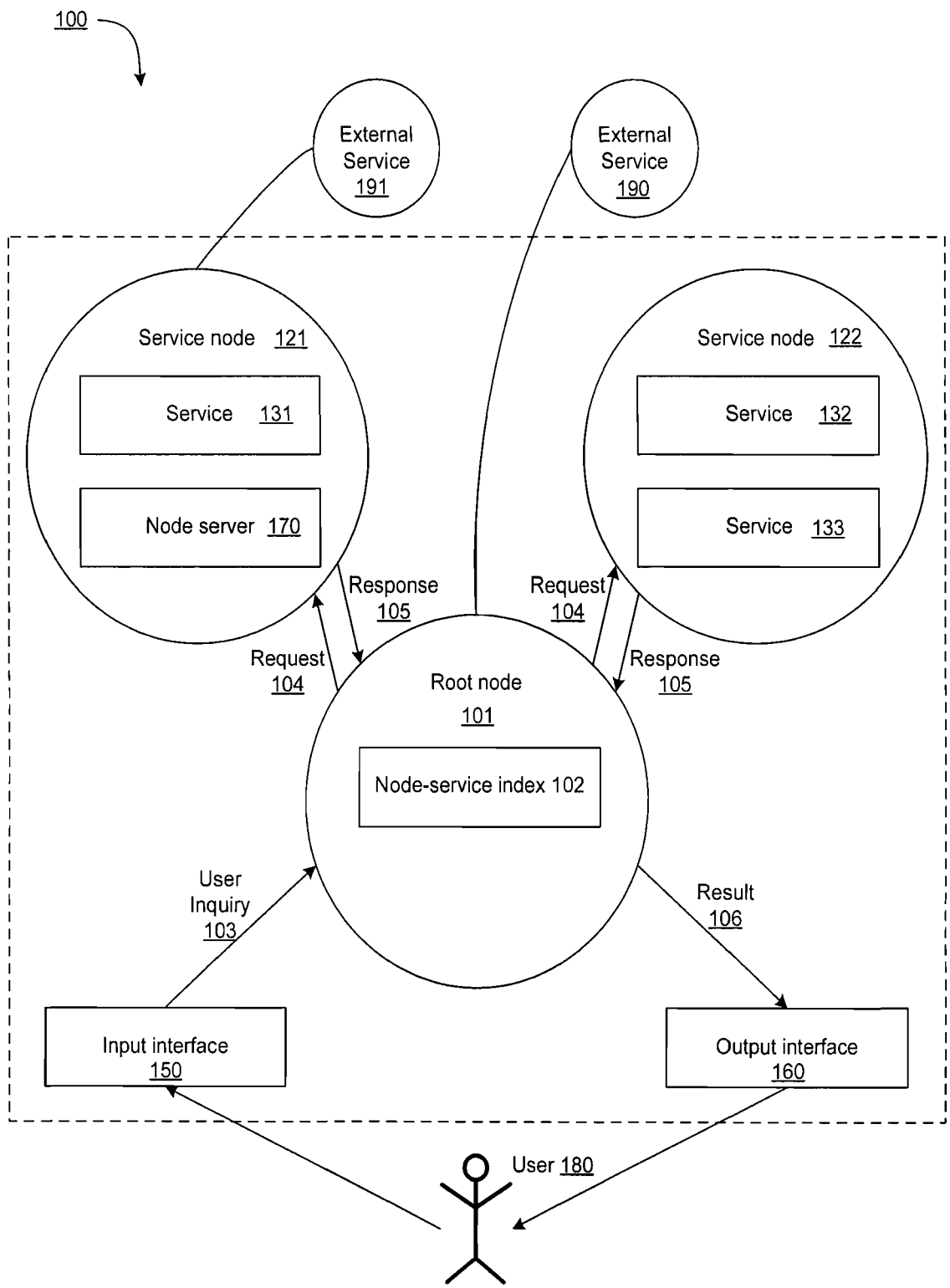
FIG. 1 is a diagram of a system for providing distributed intelligent assistance according to one embodiment.

FIG. 1 illustrates a system 100 that provides distributed intelligent assistance to users. Users may access the system via the Internet. A user 180 is defined as a person, or a web service, connected to the Internet. The system 100 includes a root node 101, a plurality of service nodes (121, 122), an input interface 150, and an output interface 160.

Each of the service nodes (121, 122) is associated with one or more service(s). For example, service node 122 is associated with services 132 and 133 that are installed within the service node 121. Service nodes can also be associated with external services outside of the system 100. For example, service node 121 is associated with an external service 191. Service nodes are able to receive requests. If the request matches the services associated with the service node, the service node can use the corresponding services to generate one or more responses and send the responses out.

The input interface 150 can receive a user inquiry 103 from the user 180. The input interface may be, but not limited to, a browser plug-in, a browser input field, a mobile application, a web page, a browser toolbar, a computer application, a computer toolbar, a widget in a website, a speech recognition, an application programming interface (API) or a combination thereof. The input interface 150 relays the user inquiry 103 to the root node 101. If the root node needs more information, the input interface 150 can solicit additional information from the user by various means, for example, via a dialogue or asking the user to fill an online form.

The root node 101 receives the user inquiry 103 and recognizes a linguistic pattern including a verb from the user inquiry 103. In some embodiments, the verb may be explicitly presented in the user inquiry. In some other embodiments, the verb may be implied and/or omitted in the user inquiry, for example, in a similar way such as omitting am, are, is, or get in spoken language. Based on the pattern, the root node 101 parses the user input 103 into a request 104. In some embodiments, the root node 101 may also parse the user input 103 into multiple requests. The root node 101 has a node-service index 102. The node-service index 102 may be maintained within the root node 101, or outside of the root node 101. The node-service index 102 contains a list of services associated with each service node. The root node 101 search through node-service index 102 and matches the request 104 to one or more services associated certain service nodes. The root node 101 then selects these service nodes and sends the request 104 to the selected nodes. The service nodes receive the request 104 and send one or more responses 105 back to the root node 101. The root node 101 constructs a result 106 based on the responses 105 it receives. The result 106 is sent to an output interface 160.

In some embodiments, the root node 101 has directed connections to external service outside of the apparatus 101, such as external service 190 shown in FIG. 1. The root node 101 may utilize the external services, as well as the service nodes, to obtain the proper responses.

The output interface 160 receives the result 106 and presents it to the user 180. The output interface 160 may be a browser plug-in, a browser input field, a mobile application, a web page, a message, an email, a browser toolbar, a computer application, a computer toolbar, a widget in a website, a speech, an application programming interface (API) or a combination thereof.

The user inquiry 103 may contain phrases in a natural language, a formal language, or a specific syntax language. The root node 101 is designed to recognize a linguistic pattern including a verb from the user inquiry containing natural language, formal language, or a specific syntax language and to parse the user input 103 into a request 104.

The user inquiry 103 may contains any verbs, such as find, search, buy, sell, publish, send, ask, answer, get, offer, compare, like, make, automate, call, set, teach, learn, remember, save, schedule, meet, compute, learn, publish, subscribe, give, put, save, create, make, post, start, stop, go to, keep, is, modify, offer, alert, book, summarize, endorse, view, help, launch, or a synonym thereof.

In some embodiments, the root node 101 may be constructed by a group (cluster) of root sub-nodes. The root sub-nodes may be inter-connected via a network. Each root sub-node is configured to perform the same functionalities as the root node. In some embodiments, each root sub-node is configured to perform a portion of the functionalities of the root node.

The service nodes may be connected with the root node 101 via the Internet. In some embodiments, some of the service nodes may be hosted virtually on the root node 101. It is possible to add or remove an associated service on a service node. In these cases, the service node is designed to send a notice to the root node 101 so that the node-service index 102 is updated.

The responses 105 are not necessarily all generated by algorithms. In some embodiments, the service nodes can obtain a response generated by a human.

The result 106 can be further organized by the root node 101 as a dossier. The dossier can contains various forms of contents, such as, but not limited to, answer, number, formula, summary, recommendation, list, table, statistics, map, graph, picture, review, audio, video, price, availability, feature, advertisement, contact, reference, excerpt, link to services, or a combinations thereof.

In some embodiments, the root node 101 and the system 100 can learn the request and the result based on an artificial intelligence analysis. A user can teach the system 100 a fact by inputting a statement. The system 100 may also be able to learn implicitly, for example by observing things a particular user does when using the system 100, or even when using other services, applications or files that the user allows the system 100 to watch and learn from.

In some embodiments, the service engine system 100 has a nodeserver program 170. The nodeserver program 170 can be installed on the service nodes so that individuals, or third-party providers, can add their own nodes to the system to extend its functionality by providing new services to the collective.

Figure 2:
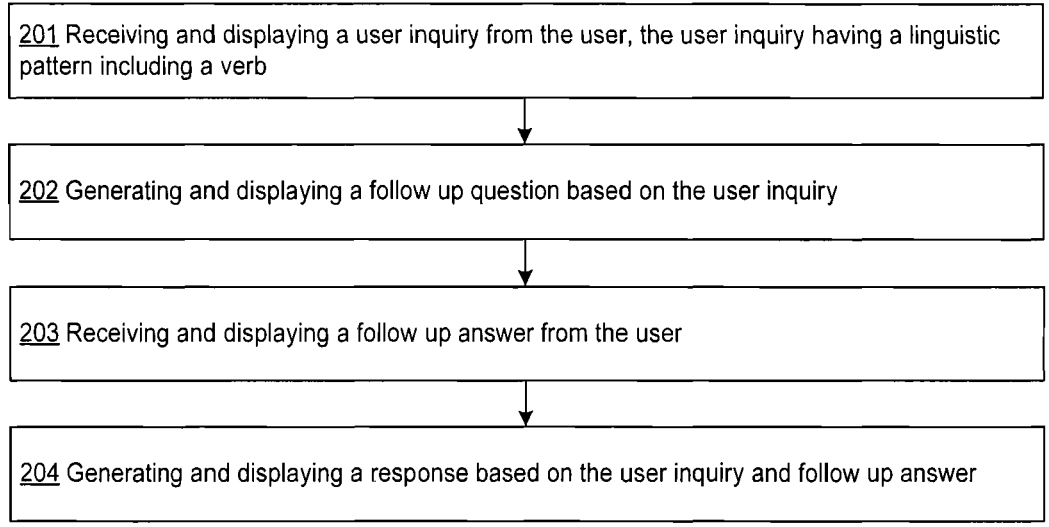
FIG. 2 depicts a flow chart illustrating an example process for providing distributed intelligent assistance according to one embodiment.

FIG. 2 depicts a flow chart illustrating an example process for providing distributed intelligent assistance for a user, according to one embodiment. First step 201 is receiving and displaying a user inquiry from the user, the user inquiry having a linguistic pattern including a verb. Then the second step 202 is generating and displaying a follow up question based on the user inquiry. After second step 202, there is a step 203 of receiving and displaying a follow up answer from the user. Then, the step 204 is generating and displaying a response based on the user inquiry and the follow up answer.

Figure 3:
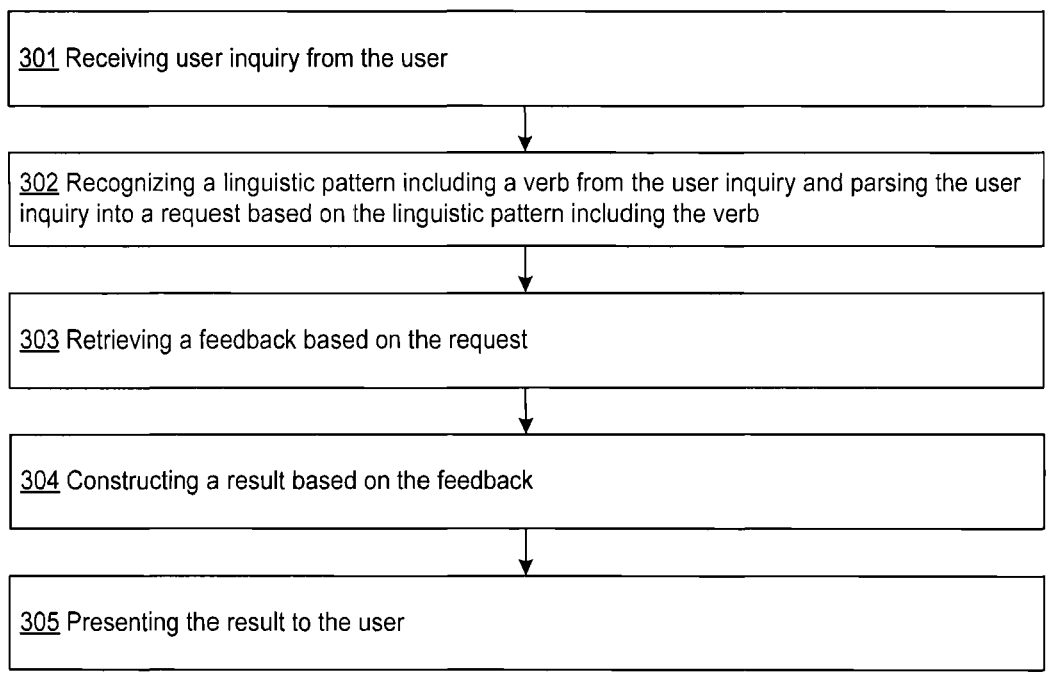
FIG. 3 depicts a flow chart illustrating another example process for providing distributed intelligent assistance according to one embodiment.

According to another embodiment, a computer-readable storage medium is provided. The computer-readable storage medium comprises computer-executable instruction for performing a method for providing distributed intelligent assistance to a user, the method comprising multiple steps. FIG. 3 depicts a flow chart illustrating an example process for providing distributed intelligent assistance for a user. First step 301 is receiving user inquiry from the user. Then, the second step 302 is recognizing a linguistic pattern including a verb from the user inquiry and parsing the user inquiry into a request based on the linguistic pattern including the verb. There is a third step 303 of retrieving a feedback based on the request. After step 303, step 304 is constructing a result based on the feedback. Then, the step 305 is presenting the result to the user.

In some embodiments, the above-mentioned method may be performed by a computer-executable instruction contained in a computer-readable medium.

In one embodiment, users interacts with a browser plug-in that replaces the standard URL navigation bar with a new field resembling a search box in it, only it can expand to be several lines taller (a search box is just one line), also referred to as the "do box." The do box facilitates the user entry of queries, statements and commands. It also has the ability to display an interactive dialog between the user and system.

In another embodiment, the do box is provided to the user as a mobile app, or directly within a webpage, or as a web browser toolbar, or as a desktop application or toolbar, as a widget in third-party sites, or as an API, etc.

In the do box, the user can ask a question or make a command, in either natural language or a formal language or a mixture of the two (some kind of syntax that the do box can understand; it can be extended to understand new syntaxes).

The system may understand the user's request and execute it or it may come back with some follow questions to the user before taking action. The system and the user may interactively dialog in a formal language, a specific syntax, or in natural language, or a mixture of these.

In some embodiments, the do box acts as a superset of a search box, a command line interface, a microblogging service, and a navigation tool, to name just a few capabilities it can provide.

For example, in some embodiment, if a user simply types a URL into it, it just does what the navigation bar in a browser does: it launches that URL in the browser. But if the user types a question, it might search for answers and provide the user either with a single answer synthesized from many sources, or it might provide a table of alternative answers from various sources.

If the user types a command, the do box would execute the command either locally or remotely via a service that can respond. Or it might give the user a set of options for where to fulfill the command, such as various services that bid on fulfilling it for them. The do box is a single all-purpose place for users to interact with the system to initiate various tasks.

The user is able to dialog with the system by typing (or perhaps even through speaking or making selections from sets of options presented to them). As this dialog progresses (perhaps through one or two rounds of interaction), the system narrows its understanding of what the user is asking for to the point where it may then take action on behalf of the user. This may happen immediately or it may require some dialog between the system and the user.

An initial user-input, such as a query, command or statement typed by the user to the system, is referred to as a "request."

A request initiates a "task" with system. A task may consist of a single request followed by a "response." Or a task may be a sequence of requests and responses by both the user and the system, in the context of a single goal. Some types of tasks that are equivalent to queries may end with a final response called an "answer," but other types end with feedback or a message from the system or another user, such a confirmation that a task has been completed. Not all tasks are queries.

Figure 4:
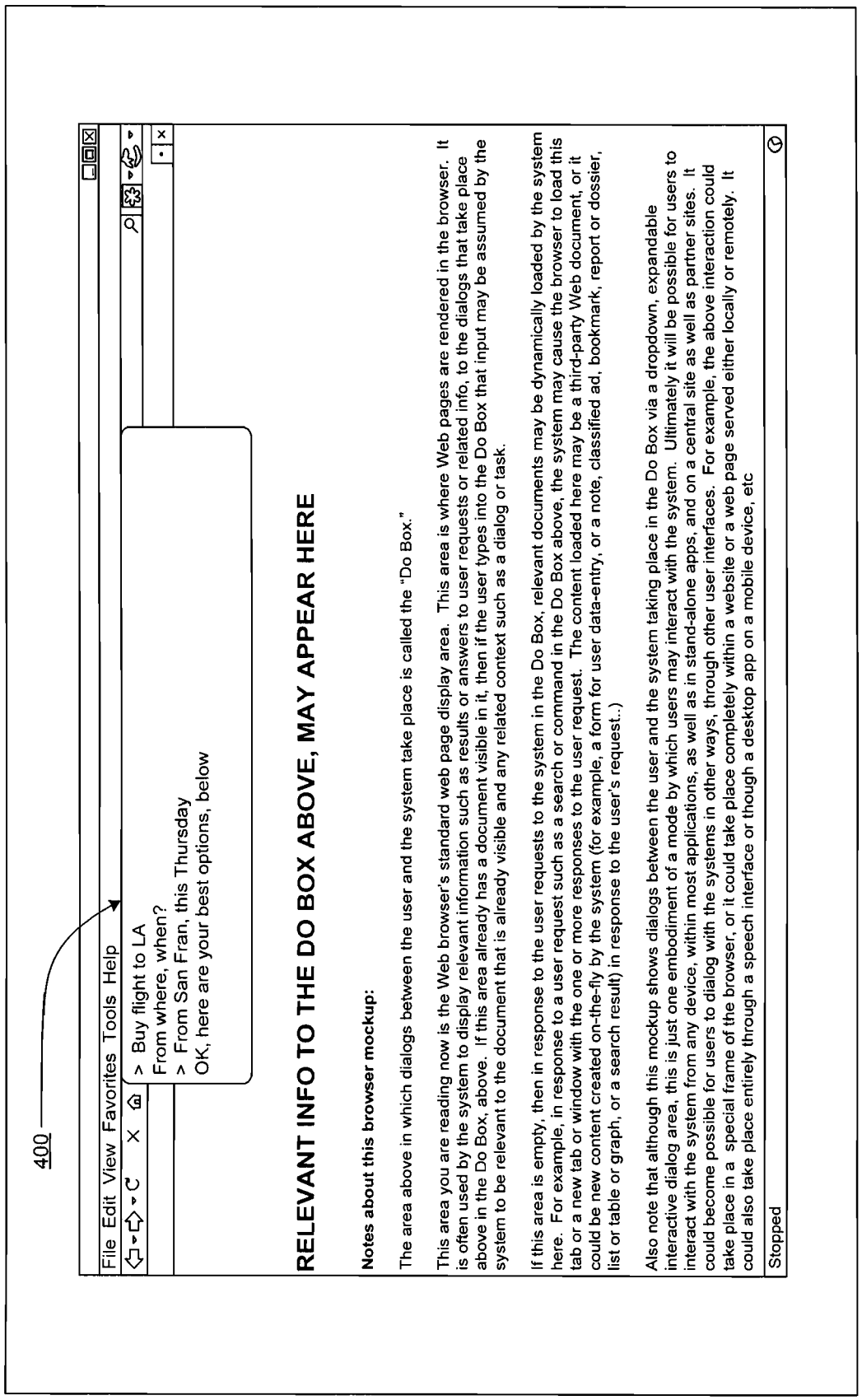
FIG. 4 illustrates an example screenshot of a browser application according to one embodiment.

As shown in FIG. 4, for example, if the user makes a request such as, "buy a flight to LA" then that initiates a task to help the user purchase a flight to LA. But that request may not yet contain enough information to provide a final response (it only says where the user wants to go), instead the system may have to ask follow up questions such as, "departing from where," "when do you want to fly," "how many people," "how many stops," "what price range," and "how many passengers?" These questions could be provided to the user as a sequence of questions the user can reply to by typing or speaking, or as a web-form or online form that appears that the user can simply fill in. Once enough information has been provided the system can then actually provide a final response.

The final response from the system comes in the form of a "result" (it could be rendered in various ways: textual or spoken words, or a numerical, or visual such as a graph or a set of pictures or a video, for example).

In some embodiments, the user may then make further requests of the system to do things with the results (for example to sort the results, search within the results, or refine the request to fine-tune the results or get different results). These initiate sub-tasks within the present task. A task is like a context, and it can end automatically or according to rules, or implicitly if the user makes requests which are clearly not of the same context, or explicitly if the user declares that they are ending the task or switching to a different task.

In the case of the "buy a flight to LA" task, the final result would be a set of flights that satisfy the user's requirements. This set of results could be rendered in any of many different ways. One way would be as a simple list, much like search results are presented on Google. Or the set of results could be presented as a faceted searchable list, where it's possible to easily drill down into the results. The results could also appear as a table, with rows and columns. The results might also include visualizations, video, speech, or other multimedia that was either found or synthesized to help responding to the request. If there are a lot of results, the system can help the user to understand the set of results, before just putting them into the results directly.

For example, in the "buy a flight to LA" example there might be results received from many different competing online travel sites that received the user request from the system. The user could optionally have the system group these responses by service so that the user could choose which service's results to view. The user could also hide results from particular services, or perhaps change the emphasis of results from various services, so that results from services they prefer would appear higher in the collective result set. The system could also provide statistics that summarize key subsets or findings in the results, for example, a link or collection of data such as "4 flights for under $300" that would take the user to specific subsets of the results.

In some embodiments, the system can also assemble a synthetic result such as a "dossier" that provides a high-level overview, summary and report for the user.

For example, the user might make a request such as "What are the best B&B's in wine country?" The system could assume that since the user is in San Francisco they probably mean the Napa Valley area when they say "wine country," or if that is not certain enough, it could ask the user which wine country they mean. The system might also ask further questions about what they mean by "best" and when they want to go etc. Or if the system has enough of a personal profile or history for the user it may already know the user's preferences, or be able to make good guesses or assumptions. In any case, after determining the meaning of the request, the system then sends it out to services that can help answer it, for example maybe TripAdvisor.com, Fodors.com, and maybe Napa and Sonoma Chamber of Commerce sites, and even to Google. Each service might reply with its results. These results are then ingested by the system and further analyzed. The system then constructs a report for the user, a "dossier" which summarizes the task and the results, makes recommendations, and shows examples to the user, and perhaps provides jumping off points for follow-on actions. This dossier could be a nicely formatted document with text in it, as well as some structured data like graphs and tables, etc. Not all results would be in the form of a dossier, it is optional. The system can also provide results in other alternative formats.

In some embodiments, tasks can be saved and even paused, as well as shared, deleted, edited, etc. So for example a user might be searching for a flight to LA when the phone rings. There is a colleague coming to ask a question about a project for a customer. The user switches context by typing a new task into the "dialog box" (like a search box but for dialoging with our system). They can initiate a new task for getting an answer to this new question without deleting the "buy a flight to LA task". That task could, for example, remains open on a background tab in the browser just like a previous search might remains on a tab after a new search is entered into the search box today. The user can go back to any paused task later and continue it. The system automatically keeps every task for every user so they can always come back to it and check it, continue it, re-use it or modify it, unless they delete it.

In some embodiments, when the system receives a request from the user. The system attempts to understand the request. This takes place through one or more techniques including parsing for specific terms and/or syntax, or using natural language and/or statistical techniques, or matching to patterns such as regular expressions, or other linguistic methods that are already known in the art.

Depending on the degree of confidence the system has that it understands the user's request narrowly enough to provide good results, the system acts on it to get results for the user. To do this, it sends out the user request (or a formal representation of it) to services (either local or remote to the system, and either part of the system or run by third-party service providers that have connected with the system) that can respond to the request.

These services then provide their responses and the system then ingests the responses (and optionally makes sense of them, assesses and/or ranks them, filters them, de-duplicates them, summarizes them, visualizes or illustrates them, generates a dossier, etc.).

Finally, the system provides a result to the user. The result may be provided as a system-generated "dossier" that attempts to summarize the results and help the user make sense of them and make a decision, or they may include the raw results provided by other services, or it may be provided as a summary or table of results that other services offer to provide or bid to provide, etc.

In some embodiments, the user may then continue to dialog with the system about this task, or they may take follow-on actions, or they may change context to a new task, or they may do something else for a while and come back later.

In some embodiments, the system is composed of "nodes" which are capable of responding to various kinds of requests. At the root of the system there is at least one (but possibly many) root nodes which provide core functionality. This enables the system to initially respond to a range of different kinds of requests (different verbs or commands such as search, buy a ticket, go to a site, send a message, learn something, share something, save something, ask a question, etc.). However, the system is designed so that third-party service providers, and even individuals, can add their own nodes to the system to extend its functionality by providing new services to the collective.

In some embodiments, nodes can be added virtually (hosted by us on a root node) or physically (hosted by somewhere else by a third-party at their own location, or a service provider such as an ISP that hosts nodes for third-parties). This is made possible by providing "nodeserver" software which enables the hosting of a node in the system. A service node has a nodeserver software running on it can be also referred to as a nodeserver. Anyone with a website or server can have their own nodeserver. They can simply host their own nodeserver, or get one that is hosted by someone else. A nodeserver enables a third-party to provide their capabilities to the system.

A nodeserver may be registered with a unique identity in the network and then be configured. To configure it, the administrator may first codify the services it provides (its "services") for the system, so that the system knows what requests to route to it.

Various applications can run on nodeservers, and can be written for nodeservers, to enable nodeservers to do various activities, or to assist with administering them. One type of application enables the admin to add new knowledge and capabilities to the nodeserver in a high-level scripting and knowledge-entry language.

In some embodiments, the system may be handle specific syntax, and perhaps a limited subset of natural language. As more nodeservers are added to the network, and they are customized or extended to provide new and specific knowledge and behaviors to the network. The system-as-a-whole "learns" new capabilities, such as the ability to generate responses to new classes of verbs, new kinds of linguistic patterns, or to handle a broader set of natural language. For example, the system might not initially be able to generate responses to requests such as, "What is the best hotel in <location>?" But a new service could be added to the network that knows how to respond to these requests with good answers. Now the system is able to give users responses to such requests, wherever they make them. So a user might make a request in their browser, and this is routed via the system to services that can respond, and their responses are then routed back to the system and then provided to the user in their browser.

One way to codify or add new services at a node is to create or configure software based intelligent assistants (programs that provide some level of "intelligent" or simply sophisticated or domain-specific capabilities such as search, reasoning, dialoging, question-answering, summarization, learning, recommendations, routing, matchmaking, brokering, comparisons, etc.) at that nodeserver. Assistants are software applications and services that specialize in providing particular services to the system, on behalf of a nodeserver and whatever it represents (for example it may represent an online service, or a physical business, or a person or a web service). There are various kinds of assistants provided by the system in the root nodeservers, and it is also possible that others might create custom assistants that run on their own or any nodeservers. Real live human assistants may also operate as part of a nodeserver.

Nodeservers may contain knowledge and capabilities that are explicitly defined or that are implicitly learned, and either manually added or automatically ingested into them.

Alternatively, in some embodiments, nodeservers may not contain much knowledge or capabilities other than to simply act as gateways or endpoints for interacting with specific existing outside third-party services (for example that bridge between the system's API and outside service API's). A gateway nodeserver would simply know how to parse requests from the system into their local language, and parse the results that those services provide into a form that they system can utilize in results.

The owner of a nodeserver may initially configure the nodeserver. This may be as simple as just registering it and configuring a few default settings. Or it could be a highly customized process, such as adding particular intelligent assistants to it for services they want it to provide. For example, if you run an online bookstore, you might get a nodeserver for it and then install a sales assistant on it. The sales assistant may then be configured to know about the products in your bookstore, your store policies, shipping prices, and other parameters of your business. Once it knows your product catalog, inventory, policies, etc., it can then reply to requests from the system about buying books that your bookstore sells.

One way to configure a nodeserver is to add knowledge manually using either a formal language or syntax for entering facts, or even using natural language. Another mode would be to automatically enter it, for example by datamining an existing database or website. An alternative semi-automated method might combine these approaches with some further programming and manipulation of settings or specifications. Knowledge entry could take place once, or in batches, or continuously and could be done by a single party or many parties at once in a single nodeserver. Another way to add knowledge to a nodeserver is to teach the node server interactively, by dialoging with the system to add facts to it, disambiguate those facts, and provide any other necessary details or specifications. Knowledge could be added in other ways as well.

Once it has been configured and has knowledge about its domain or services that it provides, the nodeserver creates a profile and index describing (or advertising) what services it provides, what policies and commercial terms it has, and what it knows about (the knowledge it contains, the kinds of requests it can respond to, the kinds of responses it can make, the kinds of patterns it recognizes or cares about, the kinds of information or data it contains, etc.). This index is then published back to the system, and ultimately enables the services of the node to be located by any party that makes a request to the network, via the system.

In some embodiments, the root nodes combine the profiles and indices of various services in the network into a unified master index which may be maintained in one or more root nodes or may be distributed with some or all of the nodes in the system. This index can be stored centrally, locally or via a distributed index (for example, through a hash table approach or a hierarchical system of semantic routers (that encode numerically defined profiles of services much like IP addresses are defined and indexed by the network of DNS servers). Various alternative architectures for storing the index and routing requests are possible.

In one embodiment, requests are made via the root nodes of the system because they are the only nodes that have the index for locating services around the network that are relevant to particular requests. In an alternative embodiment, requests could be made at any node and routed directly to relevant services, without going through root nodes.

In some embodiments, when a user request is received, the node that receives it routes it to the nearest node that can determine what nodes can respond to the request. Usually that is a root node, but it might not always be, depending on the type of request or the architecture of the system.

So for example, if an instance of the system was running within an enterprise network, certain kinds of requests could be intercepted by the enterprise nodeserver and handled locally by that nodeserver alone, while other types might be allowed to pass out through the firewall to a global public root node for the system that could then route the request to other nodes around the network, perhaps in other enterprises or online services.

There are various alternative ways to architect the back-end of the system, including but not limited to what has been described here. For example if the only nodeserver is a single root node, then it is not a distributed architecture at all, but is a more centralized system. It is also possible to create hierarchies of root nodes that specialize in particular communities or subsets of the system. For example a particular root node may serve a region like the USA or a topic area like games or an audience such as teens.

In some embodiments, certain types of requests received at a nodeserver, from the system, may be further routed by a nodeserver to other local or remote services and/or people for a response. A nodeserver can even route a request to another nodeserver. Nodeservers can also initiate their own requests to other nodeservers, as part of their own attempt to generate their response to a request. When nodeservers route to other nodeservers, the initial discovery takes place via a root node, but could also take place in a more distributed manner in alternative embodiments.

In some embodiments, multiple nodeservers can be connected via a network (a "collective") to act as a single virtual nodeserver for the system, for example for scaling and load-balancing purposes. Multiple nodeservers may also be connected in a cloud or can be connected via a hierarchy or master-slave architecture. Different nodeservers in a collective can replicate one another or can specialize in particular services to the collective.

In some embodiments, system can be configured to route particular requests, patterns of requests, or classes of requests to particular nodeservers, or to any nodeservers that satisfy particular criteria, according to an algorithm or set of algorithms and criteria.

For example, in some embodiments, all mathematical or scientific requests might be coded to always be routed to WolframAlpha.com, an external service that specializes in answering computational questions. Or the system might route such requests to a set of services it is hard-coded to use, or it might send the requests any and all services that want to try to answer them. The results are ranked according to both global and local priorities, which enables for a mixture of global perspective and personalization in the rankings.

In some embodiments, a user request can be routed to a service that actually uses other humans to generate a response. In other words, not all responses need to be software-generated. Some responses and results could be human-generated, others might combine human and software generated results.

For example, if a user makes a request such as the "flight to LA" example from above, the final results might include responses from various travel sites, and perhaps even from some human travel agents (actual humans who typed a result, or sent a link of the results they suggest, etc.).

In another embodiment, a user might make a request such as "sell my car" and after they describe their car and the terms of the sale, or provide a link to a sufficient description, it might then get routed to users who have made matching requests at other nodeservers to "buy a car." Those users could then respond to the original requester with their particular bids, and/or with typed messages. Another example might be a request such as "What happened to Sue Smith after High School?" In this case, the system would first need to disambiguate "Sue Smith" and then might provide answers from services like Classmates.com, Facebook.com, Linkedin.com, Twitter.com, as well as perhaps from particular people who know about Sue, and even from Sue herself. The system would assemble these answers into a meaningful, manageable result and present that to the user.

In one embodiment, it is possible for people to explicitly teach the system, and for the system to learn from people implicitly. A user can teach the system a fact by making a statement (effectively, a statement is a request to the system to save that statement, if nothing else). There are various ways to teach the system formally by making formal statements in a formal language or syntax, or even by making natural language expressions that qualify as statements (such as a statement of fact or knowledge, an assertion about something, etc.).

The system remembers everything that is ever typed into it by each user and associates that with that user. The system attempts to understand all requests at the time they are entered. If the system does not understand the request, or it doesn't understand what to do with it, it at least saves it for later (and at a later time when it either has more knowledge or capabilities it may revisit saved but not yet responded to requests and attempt to respond to them then, if the user wants that service).

In some embodiments, the system may also be able to learn implicitly, for example by observing things a particular user does when using the system, or even when using other services, applications or files that the user allows the system to watch and learn from.

The system partitions what it learns for each user, but also attempts to infer or synthesize more general knowledge from that—knowledge that might not only be valid or relevant to the perspective of a particular user, but might appeal to a community or globally to everyone. For example, a single user, Sue, might add a bunch of statements about their website. Sue would in effect be an expert on the topic of her website. When Sue asks anything about her website, the knowledge she entered would have higher rank than anything else.

When Bob asks about Sue's website he might get a result that includes statements by Sue and statements by others. The way this works is by a process of superposition. Statements that are made by multiple parties have more weight than statements by individuals. The broader the set of parties who make statements that match, the more confidence and the more globally relevant this statement is. This affects the weight of that statement in results for everyone.

So if Bob asks a question about Sue's website the results would include a weighted ranked set of answers. The highest ranked might be those that the most people agree with and/or those which are most authoritative (agreement is indicated either by making a similar or identical statement, or by making a statement of agreement about someone's statement about Sue's website, and authority could for example be measured by the reputation or relevance of a party making a statement to the current topic and/or to Bob and Sue).

In some embodiments, by creating a personal account with the system, a user can personalize their use of the system. The system can learn from them, and it can adjust its results to suit what it learns about their priorities, tastes, preferences, needs, etc. Personalization can take place implicitly (by learning and adjusting to what users do) and explicitly (by providing a way for users to teach the system, tune what it does, define their interests and priorities, add in information about themselves, etc.). By connecting their account to other accounts and services they use a user may further personalize the system for their needs. For example, if a user connects their account in the system to their Facebook account the system could then perhaps provide services to them from the do box that would do things in Facebook (post to Facebook, send a message to someone, search in Facebook, etc.).

There also other alternative ways to represent and weight knowledge in the system (for example using the Semantic Web, statistical weights or other kinds of graphs, the social graph, networks of trust, etc.). In some embodiments, result rankings may be further refined by weights that reflect how much Sue likes or trusts certain parties, or how much others like or trust those parties, as represented by agreement with statements they make, links to them by others who are relevant to the context or to Sue, statistics about their popularity and user satisfaction with their services in the system, or even by the price paid to market their results compared to the results provided by others, to name a few examples.

In some embodiments, the system provides services to assess the authority, quality, relevancy, and utility of the knowledge it gets from users (including from people and from other services on the network). These services can run locally at nodeservers, as well as globally at root nodeservers. They may be software mediated but can also include meta-knowledge about the knowledge in the system provided by users themselves, for example via statements about statements added by those users, or by inferring that knowledge from data from collaborative filtering or social filtering of the results.

For example, in one embodiment, users who choose to act on particular results and not others are effectively voting for those results by doing so. If they save those results, or make a purchase, or dialog the system about certain results, the vote is stronger. If they explicitly make a statement such as "I like that result", for example, by starting a result, rating a result as good on a five star scale, or by clicking a button next to the result that says "More like this." The system also uses statistical techniques and can utilize editors to create knowledge and assess the quality of knowledge for the purpose of filtering and ranking it in result sets.

Although knowledge can be entered manually into the system, the vast majority of knowledge may be entered automatically, by simply ingesting it from databases and other existing online services or sets of documents. Alternatively nodeservers may not ingest the knowledge in advance of a request, but may simply provide gateways or endpoints that represent existing services to the network and generate knowledge and responses to requests "on the fly."

In some embodiments, the extensible distributed "Do Engine" starts with a central website that provides a centrally hosted do box (aka "Dialog Box") interface for consumers. Enable consumers to use it as guests or to create their own accounts for more capabilities. Services are provided around an initial set of useful, high-value verbs: for example verbs related to commerce and shopping, verbs related to messaging and communication, verbs related to knowledge and search, verbs related to topics like news, sports, entertainment, travel, health, people, business, dining, finance, etc. Plugins for web browsers and desktop applications that add the do box to those apps are provided. For example, the plugin completely replaces the navigation bar and/or the search box in a standard web browsers (Chrome, Mozilla, IE, Safari) with the do box. It might also include an optional toolbar version of the Do Bar for users who want to keep their navigation bar and search box. A free hosted nodeserver is provided with a default set of assistants or services modules that can be easily configured. Let anyone configure this system for any website, or even for themselves as individuals that provide services to the network. Free downloadable nodeserver software is provided that anyone can install to add a service to the network, for example for their website, online service, web service or business. Mobile application versions of the do box is provided so that people can access it on mobile devices. A speech interface is included as an option.

In some embodiments, there is provided an interactive user-interface that enables a user to initiate various kinds of tasks, and for the user and system to dialog interactively to complete any or all of the following tasks, or any combination thereof. In one embodiment, there is provided a user accesses interface within a desktop application (such as via a browser toolbar that appears in their web browser, or a desktop application, or a plugin into another application or operating system). In another embodiment, user may access interface via a web application via a webpage using a widget or an interactive text dialog area within a webpage (such as in a site run by the system, or that is run by a third party that has a nodeserver or is part of our network and uses our API). In yet another embodiment, user may access interface via an API (if the user is a program, rather than a person). In still another embodiment, access to system also optionally may be provided by a speech interface on a phone or mobile device.

In some embodiments, the above user-interface as part of a system can have some or all of the specific kinds of following capabilities in any combination thereof. The capabilities includes: to interpret user input into a service-request, to interpret specific commands and patterns, to interpret various alternative syntaxes for input, to interpret regular expressions, to interpret various degrees of natural language input, to route service-requests to local or remote service-providers that can complete the service-requests (and/or are available to complete them), and provide responses, from services that reply to the service-requests, to the user, to route service requests based on rules and/or a routing table or search index and/or a network or tree of connected routing tables or search indices, to provide output to the user, to provide output to the user in the form of patterns mapped via rules from user input patterns, to provide output to the user in the form of varying degrees of natural language, to provide output to user directly from other services, or can post-process output from other services before providing to user, to provide output to the user either directly within the do box interface dialog, or as webpages in the browser, or via speech, or via an external documents or applications.

The capabilities or features may also includes: the Do box and the backend distributed intelligent assistance system that are programmable and extensible, nodeserver software that is provided to enable third-parties to add nodes that provide their services to the system, the ability to learn about the relative value and quality of service providers based on feedback from users, and from their responses to user requests, the ability to rank responses from service providers and list them ordered by rank when presenting them to users, the ability to enable service providers advertise to make their responses more visible to user, the ability to detect when a user wants to narrow or broaden the present task, versus initiating a new task, the ability to respond to user request with forms for further specifying a tasks, where the forms are constructed on-the-fly or provided from a database or ontology of forms for specifying various kinds of tasks, the ability to complete certain requests directly and respond to the user with system-generated synthetic answers (such as the result of a simple calculation, or more complex reports such as "dossiers"), or answers from specific services, instead of routing to all other services and letting them compete to provide answers, the ability to route requests to local or remote applications (for example, applications on the user's device, or on a remote device), the ability to work on tasks for user even after user is away from their computer, or goes offline or when they are working in another application or on another task, the ability to learn implicitly from user input, activity, as well as from explicit feedback or knowledge-entry, the ability to support rules and/or plugins that pre-process user input before it is interpreted into service requests.

Figure 5:
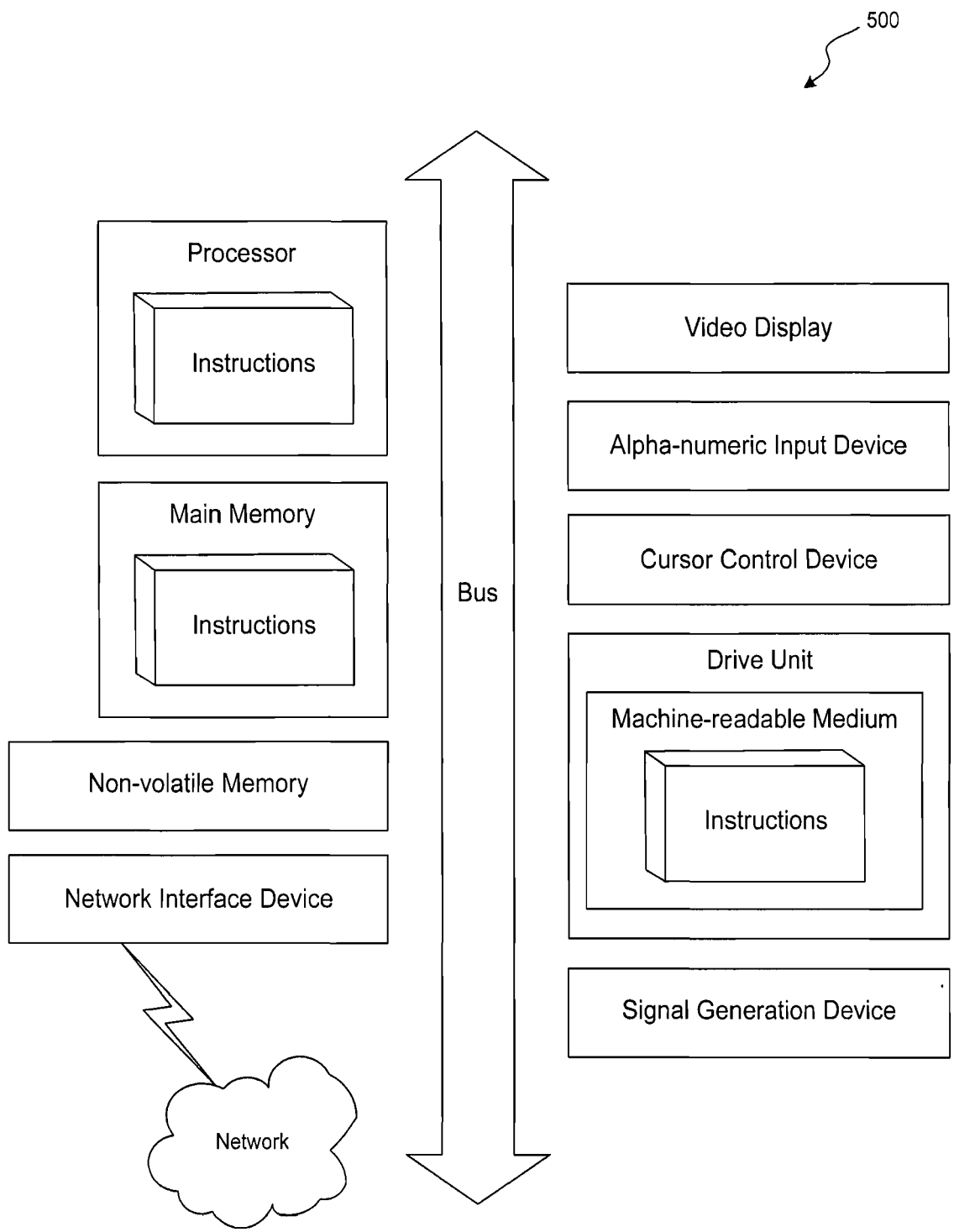
FIG. 5 shows a diagrammatic representation of a machine in the example form of a computer system within which a set of instructions, for causing the machine to perform any one or more of the methodologies discussed herein, may be executed, according to one embodiment.

FIG. 5 shows a diagrammatic representation of a machine in the example form of a computer system 500 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine.

While the machine-readable medium is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. In some embodiments, the machine-readable medium may be a computer-readable storage medium.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A method comprising:
   receiving, by a computer system, natural language input from a mobile device during a conversation between a computer-implemented intelligent assistant and the mobile device;
   processing, by the computer system, the natural language input to identify a linguistic pattern of terms in the natural language input;
   determining, by the computer system, an intent of the natural language input based on the linguistic pattern of terms in the natural language input;
   determining, by the computer system, to send the natural language input to a device associated with a human for a response to the natural language input based on the intent of the natural language input and on an index for locating services that are relevant to the intent;
   sending, by the computer system, the natural language input to the device associated with the human to request that the human provide the response;
   receiving, by the computer system, the response; and
   providing, by the computer system, the response via a conversation user interface displayed via a display associated with the mobile device, the response being represented within the conversation user interface as originating from the intelligent assistant.

2. The method of claim 1, further comprising:
   monitoring activities of a user when interacting with the intelligent assistant; and
   determining a response to subsequently received natural language input based on the activities.

3. The method of claim 1, further comprising:
   providing a follow up question to the natural language input via a fillable form;
   receiving a follow up answer from the mobile device via the fillable form, the follow up answer comprising a filled form; and
   providing the follow up answer to the device associated with the human.

4. The method of claim 1, further comprising:
   determining a location of the mobile device; and
   determining another response for the conversation based on the location of the mobile device.

5. The method of claim 1, further comprising:
   identifying a profile associated with a user; and
   determining another response for the conversation based on the profile associated with the user.

6. The method of claim 1, further comprising:
   identifying history data indicating previous interactions of the mobile device with the intelligent assistant; and
   determining another response for the conversation based on the history data.

7. The method of claim 1, wherein the processing the natural language input includes parsing the natural language input into the linguistic pattern of terms.

8. A non-transitory computer-readable media storing computer-executable instructions that, when executed by a processor of a system, cause the system to perform operations comprising:
   receive user input during a conversation between a computer-implemented intelligent assistant and a user;
   determine to send the user input to a computing device associated with a human based on a linguistic pattern of terms in the user input and on an index for locating services that are relevant to the user input;
   send the user input to the computing device associated with the human;
   receive human input from the human regarding the user input;
   determine a response based on the human input; and
   cause the response to be displayed within a conversation user interface, the response being represented within the conversation user interface as originating from the intelligent assistant.

9. The non-transitory computer-readable media of claim 8, wherein the response indicates that a task has been performed to satisfy the user input, the task including at least one of buying an item or service, selling an item or service, publishing, sending a message, offering, comparing, making, automating, calling, setting, learning, saving, scheduling, subscribing, posting, starting, stopping, modifying, alerting, booking, or summarizing.

10. The non-transitory computer-readable media of claim 8, wherein the operations further comprise:
   monitor activities of the human; and
   determine a response to a subsequently received user input based on the activities.

11. The non-transitory computer-readable media of claim 8, wherein the operations further comprise:
   provide a follow up question to the user input;
   receive a follow up answer from the user; and
   provide the follow up answer to the computing device associated with the human.

12. The one or more non-transitory computer-readable media of claim 8, wherein the operations further comprise:
   determine a location of the user; and
   determine the response based on the location of the user.

13. The one or more non-transitory computer-readable media of claim 8, wherein the operations further comprise:
   identify a profile associated with the user; and
   determine the response based on the profile associated with the user.

14. The one or more non-transitory computer-readable media of claim 8, wherein the operations further comprise:
   identify history data indicating previous interactions of the user with the intelligent assistant; and
   determine the response based on the history data.

15. A system comprising:
   one or more processors; and
   memory communicatively coupled to the one or more processors and configured to store instructions that, when executed by the one or more processors, cause the system to perform operations comprising:
      receive user input of a user at a computer-implemented intelligent assistant;
      determine to send the user input to a computing device associated with a human based on a linguistic pattern of terms in the user input and on an index for locating services that are relevant to the user input;
      cause the user input to be sent to the computing device associated with the human;
      receive human input from the human regarding the user input;
      determine a response based on the human input; and
      provide the response within a conversation user interface as originating from the computer-implemented intelligent assistant.

16. The system of claim 15, wherein the operations further comprise:
   monitor activities of the user or another user when interacting with the intelligent assistant; and
   determine a response to a subsequently received user input based on the activities.

17. The system of claim 15, wherein the operations further comprise:
   determine a location of the user; and
   determine the response based on the location of the user.

18. The system of claim 15, wherein the operations further comprise:
   identify a profile associated with the user; and
   determine the response based on the profile associated with the user.

19. The system of claim 15, wherein the operations further comprise:
   identify history data indicating previous interactions of the user with the intelligent assistant; and
   determine the response based on the history data.

20. The system of claim 15, wherein the operations further comprise:
   connect to an account for the user that is associated with a social networking site; and
   perform a task for the user based on the account for the user;
   wherein the response indicates that the task was performed for the user.

* * * * *